(12) United States Patent
Andersson et al.

(10) Patent No.: US 12,167,043 B2
(45) Date of Patent: *Dec. 10, 2024

(54) DEBLOCKING OF TRANSFORM SUB-BLOCK BOUNDARIES

(71) Applicant: Telefonaktiebolaget LM Ericsson (publ), Stockholm (SE)

(72) Inventors: Kenneth Andersson, Gävle (SE); Jack Enhorn, Kista (SE); Zhi Zhang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/370,081

(22) Filed: Sep. 19, 2023

(65) Prior Publication Data
US 2024/0080494 A1    Mar. 7, 2024

Related U.S. Application Data

(63) Continuation of application No. 17/430,252, filed as application No. PCT/SE2020/050153 on Feb. 12, 2020, now Pat. No. 11,831,926.
(Continued)

(51) Int. Cl.
*H04N 19/86* (2014.01)
*H04N 19/11* (2014.01)
(Continued)

(52) U.S. Cl.
CPC ............ *H04N 19/80* (2014.11); *H04N 19/11* (2014.11); *H04N 19/117* (2014.11);
(Continued)

(58) Field of Classification Search
CPC ...... H04N 19/80; H04N 19/11; H04N 19/117; H04N 19/12; H04N 19/132; H04N 19/167; H04N 19/176; H04N 19/61; H04N 19/86
See application file for complete search history.

(56) References Cited

U.S. PATENT DOCUMENTS

| 2013/0022107 A1 | 1/2013 | Van der Auwera |
| 2013/0259120 A1 | 10/2013 | Van der Auwera |

(Continued)

FOREIGN PATENT DOCUMENTS

| CN | 102598669 A | 7/2012 |
| CN | 103718552 A | 4/2014 |

(Continued)

OTHER PUBLICATIONS

Zhu, W. et al., "Deblocking Improvements for Large CUs", Document: JVET-J0077rl, Joint Video Experts Team (JVET) of ITU-T SG 16 WP 3 and ISO/IEC JTC I/SC 29/WG 11, 10th Meeting: San Diego, US, Apr. 10-20, 2018, XP030151274 (7 pages).
(Continued)

*Primary Examiner* — Patrick E Demosky
(74) *Attorney, Agent, or Firm* — Rothwell, Figg, Ernst & Manbeck, P.C.

(57) ABSTRACT

A method for deblocking at least one boundary of a coding unit. The method includes determining that the coding unit uses a sub-block transform, wherein the sub-block transform generates a transform sub-block boundary within the coding unit, thereby forming at least a transform sub-block within the coding unit; as a result of determining that the coding unit uses the sub-block transform, determining a maximum filter length based on a dimension of the transform sub-block within the coding unit, wherein the maximum filter length indicates a maximum number of samples to modify when deblocking a boundary of the coding unit; and deblocking
(Continued)

the boundary of the coding unit based on the determined maximum filter length.

11 Claims, 10 Drawing Sheets

Related U.S. Application Data

(60) Provisional application No. 62/806,291, filed on Feb. 15, 2019.

(51) Int. Cl.
| | | |
|---|---|---|
| *H04N 19/117* | (2014.01) | |
| *H04N 19/12* | (2014.01) | |
| *H04N 19/132* | (2014.01) | |
| *H04N 19/167* | (2014.01) | |
| *H04N 19/176* | (2014.01) | |
| *H04N 19/61* | (2014.01) | |
| *H04N 19/80* | (2014.01) | |

(52) U.S. Cl.
CPC ............ *H04N 19/12* (2014.11); *H04N 19/132* (2014.11); *H04N 19/167* (2014.11); *H04N 19/176* (2014.11); *H04N 19/61* (2014.11)

(56) References Cited

U.S. PATENT DOCUMENTS

| | | | |
|---|---|---|---|
| 2013/0294525 A1 | 11/2013 | Norkin et al. | |
| 2015/0229924 A1 | 8/2015 | Kim et al. | |
| 2015/0264406 A1 | 9/2015 | Kim et al. | |
| 2022/0014793 A1* | 1/2022 | Wang ................. | H04N 19/503 |

FOREIGN PATENT DOCUMENTS

| | | |
|---|---|---|
| CN | 104303501 A | 1/2015 |
| CN | 106105201 A | 11/2016 |
| WO | 2019/137750 | 7/2019 |
| WO | 2019/243498 | 12/2019 |

OTHER PUBLICATIONS

Kawamura, K. et al., "Extended deblocking-filter decision for large block boundary", Document: JVET-D0047, Joint Video Exploration Team (JVET) of ITU-T SG 16 WP 3 and ISO/IEC JTC 1/SC 29/WG 11, 4th Meeting: Chengdu, CN, Oct. 15-21, 2016, XP030247461 (3 pages).

Zhu, W. et al., "CE11: Deblocking modifications for Large CUs both luma and chroma (Test 11.1.7a and CE11.1.7b)", Document: JVET-L0405r1, Joint Video Experts Team (JVET) of ITU-T SG 16 WP 3 and ISO/IEC JTC 1/SC 29/WG 11, 12th Meeting: Macao, CN, Oct. 3-12, 2018, XP03194511 (11 pages).

Shi, Z. et al., "CE12, Subset 1: Report of Deblocking for Large Size Blocks", Document: JCTVC-G409, Joint Collaborative Team on Video Coding (JCT-VC) of ITU-T SG16 WP3 and ISO/IEC JTC1/SC29/WG11, 7th Meeting: Geneva, CH, Nov. 21-30, 2011, XP030110393 (19 pages).

International Search Report and Written Opinion dated Apr. 17, 2020 in International Application No. PCT/SE2020/050153 (15 pages total).

Bross, B., et al., "Versatile Video Coding (Draft 4)", Document: JVET-M1001v2, Joint Video Experts Team (JVET) of ITU-T SG 16 WP 3 and ISO/IEC JTC 1/SC 29/WG 11, 13th Meeting: Marrakech, MA, Jan. 9-18, 2019 (248 pp.).

Bross, B., et al., "Versatile Video Coding (Draft 4)", Document: JVET-M1001v1, Joint Video Experts Team (JVET) of ITU-T SG 16 WP 3 and ISO/IEC JTC 1/SC 29/WG 11, 13th Meeting: Marrakech, MA, Jan. 9-18, 2019 (241 pages).

Andersson, K., et al., "CE2-2.1.1: Long deblocking filters and fixes", Document: JVET-K0307-v1, Joint Video Experts Team (JVET) of ITU-T SG 16 WP 3 and ISO/IEC JTC 1/SC 29/WG 11, 11th Meeting: Ljubljana, SI, Jul. 10-18, 2018 (6 pages).

* cited by examiner

DEBLOCKING OF TRANSFORM SUB-BLOCK BOUNDARIES

CROSS-REFERENCE TO RELATED APPLICATIONS

This application is a continuation of U.S. application Ser. No. 17/430,252, filed on Aug. 11, 2021 (now U.S. Pat. No. 11,831,926, issued on Nov. 28, 2023), which is a 35 U.S.C. § 371 National Stage of International Application No. PCT/SE2020/050153, filed Feb. 12, 2020, which claims priority to U.S. provisional application No. 62/806,291, filed on Feb. 15, 2019. The above identified applications are incorporated by this reference.

TECHNICAL FIELD

This disclosure relates to High Efficiency Video Coding (HEVC) and Versatile Video Coding (VVC).

BACKGROUND

A video sequence consists of a series of images where each image consists of one or more components. Each component can be described as a two-dimensional rectangular array of sample values. An image in a video sequence may consist of three components; one luma component Y where the sample values are luma values and two chroma components Cb and Cr, where the sample values are chroma values. Other examples include Y' Cb Cr, Yuv and $IC_TC_P$. In $IC_TC_P$, I is the "intensity luma" component. In the context of the current disclosure, any luma component will be referred to as Y', Y or I as Y or simply luma. The dimensions of the chroma components may be smaller than the luma components by a factor of two in each dimension. For example, the size of the luma component of an HD image would be 1920×1080 and the chroma components would each have the dimension of 960×540. Components are sometimes referred to as color components.

A block is one two-dimensional array of samples. In video coding, each component is split into blocks and the coded video bitstream is a series of blocks. In video coding, the image may be split into units that cover a specific area of the image. Each unit consists of all blocks from all components that make up that specific area and each block belongs fully to one unit. The macroblock in H.264 and the Coding unit (CU) in HEVC are examples of units.

In HEVC, each picture is partitioned into coding tree units (CTU). A CTU consist of an N×N block of luma samples and two M×M corresponding chroma blocks. A CTU in HEVC is like macroblocks in H.264 and earlier standards but in contrast to macroblocks the CTU size is configurable. Most often, however, the CTU size in HEVC is set to 64×64 luma samples. Each CTU can be recursively quadtree split. The root of the quadtree is then associated with the CTU. The quadtree is split until a leaf is reached, which is referred to as the coding unit (CU). A CU in HEVC always consist of a luma block with equal height and width. How each CTU is split is conveyed in the bitstream. The CU is further the root node of two other trees, the prediction tree that has got prediction units (PUs) as nodes and the transform tree that has got transform units (TUs) as nodes. Some decoding processes in HEVC is done on the CU level, some is done on the PU level and some on TU level. Boundaries between PUs and boundaries between TUs are filtered by a deblocking filter to reduce discontinuities between TUs and PUs. In HEVC there exist two kinds of prediction types for a PU, intra prediction which only uses prediction from previously decoded samples of the current picture for prediction, and inter prediction which uses prediction from at least one previously decoded picture.

In HEVC, deblocking is first applied on vertical boundaries and then on horizontal boundaries. The boundaries are either TU boundaries or PU boundaries. To enable parallel friendly deblocking, the deblocking is performed on an 8×8 sample grid.

A deblocking filter strength parameter (bs) is set for each boundary. If the value of bs is larger than 0, then deblocking may be applied. The larger the boundary strength is, a stronger filtering is applied. First it is checked, if any of the blocks at a PU boundary between the blocks is an intra predicted block then (bs is set to =2), or if both blocks use inter prediction but and they use different reference frames or have significantly different motion vectors then (bs is set to =1). It is also checked if a TU boundary between the blocks has non-zero transform coefficients in at least one of the blocks (code block flag CBF equal to 1), then (bs is set to =1). This first checks sets a boundary strength (bs) which is larger than 0 to indicate that deblocking should be applied. The larger the boundary strength is the stronger filtering is applied. To reduce/avoid removing natural structures when deblocking, a check that there are not any natural structures on respective sides of the boundary is then applied for luma. In HEVC, gradient calculations are used on respective sides of the boundary using the following inequality: abs(p0−2*p1+p2)+abs(q0−2*q1+q2)<beta, where beta is a parameter based on the quantization parameter for the block and p0, p1, to p2 are samples on one side of the block boundary and q0, q1, to q2 are samples on the other side of the block boundary. The condition is checked at two positions along the boundary, and if both conditions are fulfilled, then the luma samples are deblocked for that 4 sample part of the boundary. Chroma boundaries may always be filtered if one any of the neighbouring blocks are intra coded.

In the current draft of the specification for VVC (VVC draft 2 JVET-M1001) a coding tree unit (CTU) is similar to the CTU in HEVC with the difference that the CTU in H.266 has a size of 128×128 luma samples. In VVC, the CTU can be split more flexibly such that a resulting CUs may consist of a rectangular luma block. In VVC, there is no prediction tree or transform tree as in HEVC. However, a CU in VVC can be divided into a multiple of TUs as follows:
  (1) A CU has a size larger than the maximum transform size (e.g., if the max transform size is 64×64 and the CU has a size of 128×128 the CU is divided into four 64×64 implicit split transform blocks, as shown in FIG. 1);
  (2) A CU uses SBT, Sub-Block Transform, which may enable one sub-block transform of size ½ or ¼ of the CU size either vertically or horizontally with non-zero coefficients, where direction (horizontal or vertical), position (first or second sub-block for size ½, first or last sub-block for size ¼) and size (½ or ¼) is derived from the bitstream, as shown in FIG. 2; and
  (3) A CU uses ISP, Intra Sub-Partitions, which may enable 4 sub-blocks each of size ¼ of the CU size either vertically or horizontally or for smaller blocks 2 sub-blocks each of size ½ of the CU size either vertically or horizontally, as shown in FIG. 3.

In VVC, a CU can be divided into multiple prediction sub-blocks in cases as follows:

(1) A CU uses sub-block inter prediction tool AFFINE. This tool can have motion parameters (motion vector and indication of reference frame) on sub-block size 4×4;

(2) A CU uses sub-block inter prediction tool ATMVP (this tool can have motion parameters (motion vector and indication of reference frame) on sub-block size 8×8, as shown in FIG. 4); and (3) A CU uses a Combined Intra Inter Prediction mode that uses four sub-block specific weights each for ¼ size of the CU in the direction of the prediction for weighted combination of intra and inter prediction, as shown in FIG. 5.

In VVC, the deblocking is applied on an 8×8 grid for CUs that have a CU boundary aligned with an 8×8 grid first on vertical boundaries (CU/implicit TU/prediction sub-block boundaries) and then on horizontal boundaries (CU/implicit TU/prediction sub-blocks). The deblocking is based on HEVC deblocking and also longer deblocking filter if the size orthogonal to the block boundary is equal to or larger than 32 on at least one side for luma modifying at most 7 samples and reading at most 8 samples on that side, if the size orthogonal to the block boundary is less than 32 for one side for luma it modifies at most 3 samples and reading at most 4 samples on that side, and if it is equal to or larger than 8 on both side of a boundary in chroma samples for chroma modifying at most 3 chroma samples and reading at most 4 chroma samples on respective side of the boundary otherwise it modifies at most one sample and reading at most two samples on respective side of the boundary.

Both CU, implicit TU and prediction sub-block boundaries can be deblocked in parallel since the number of samples to read and modify is restricted depending on:

(1) the max number of samples to modify for a CU or implicit TU boundary is limited to 5 (reading at most 6 samples) if the CU uses prediction sub-blocks;

(2) the max number of samples to modify for a prediction sub-block boundary adjacent to a CU or implicit TU boundary is 2 on both side of such boundaries (reading at most 3 samples on each side).

(3) otherwise the max number of samples to modify is 3 on each side of a boundary.

Only a CTU line buffer of 4 for luma and 2 for chroma is needed due to restricting the max number of samples to modify to 3 samples for luma (reading at most 4 samples) on the side that is above the boundary and 1 chroma sample for chroma (reading at most 2 samples) on both sides of the boundary for horizontal boundaries that are aligned with the CTU boundary.

In VVC, the boundary strength (bS) is set individually for luma and chroma components, both luma and chroma is given a bS equal to 2 for a transform block boundary if intra mode is used on either side, or if Combined Intra Inter Prediction (CIIP) is used on either side. If the boundary is a transform block boundary and the transform block have non-zero transform coefficients on a color component that component is given a Bs equal to 1. For other cases the boundary strength is set to 0 for both chroma components which corresponds to no deblocking. If the boundary is a prediction block/sub-block boundary and CIIP is used on either side bS is set equal to 1 for luma, If the boundary is a prediction block/sub-block boundary and there is a difference in number of reference picture used on respective side of the boundary or different reference pictures are used or if there is a significant difference in motion vectors when same reference picture(s) are used the bS is set equal to 1 for luma. Otherwise bS is set equal to 0 for luma which corresponds to no deblocking of luma.

SUMMARY

In VTM-4.0 and VVC there exists two tools that may provide transform sub-block boundaries inside a CU, e.g., Intra Sub Partitions (ISP) and Sub-block transforms (SBT). Such transform sub-block boundaries are not deblocked in VVC unless they coincide with boundaries from sub-block prediction tools.

Another problem with conventional methods is how to determine a maximum filter length (number of samples to read and number of samples to modify) on respective side of a transform sub-block boundary to enable both long and short deblocking filters depending on sub-block size to enable deblocking in parallel and not to make decisions on deblocked samples.

Another problem with conventional methods is that large additional transform sub-block boundaries 4×N can appear on a non 8×8 grid (e.g. 4×4 grid). For example a CU that uses ISP and has width 16 and divides the CU into 4 regions of width 4 where the height of the CU can be larger than 16 or a CU that has height 16 and divides the CU into 4 regions of height 4 where the width of the CU is larger than 16. Similarily a CU that uses SBT and has width 16 and divides the CU into one region with width 4 where the height can be larger than 16 or a CU with height 16 and divides the CU into one region with height 4 where the width of the CU can be larger than 16.

Another problem with conventional methods is that an SBT boundary may appear on an 8×8 picture grid but not be filtered since CU that are not on an 8×8 grid are not filtered. This may happen when the CU is a result of a ternary split that results in a CU with width 8 where the CU uses SBT and splits the CU into two regions.

The proposed solutions disclosed herein determines max filter length (number of samples to read and number of samples to modify) on respective side of CU and transform sub-block boundaries inside the CU based on whether a CU uses a transform sub-blocks tool such as ISP and SBT.

Accordingly, in one aspect there is provided a first method for deblocking at least one boundary of a coding unit. The method includes determining that the coding unit uses a sub-block transform, wherein the sub-block transform generates a transform sub-block boundary within the coding unit, thereby forming at least a transform sub-block within the coding unit. The method also includes, as a result of determining that the coding unit uses the sub-block transform, determining a maximum filter length based on a dimension of the transform sub-block within the coding unit, wherein the maximum filter length indicates a maximum number of samples to modify when deblocking a boundary of the coding unit. The method further includes deblocking the boundary of the coding unit based on the determined maximum filter length.

In some embodiments the sub-block transform comprises Sub-Block Transforms (SBT) and/or Intra Sub Partitions (ISP).

In some embodiments, the determined max filter length is reduced if the coding unit uses prediction sub-blocks comprising a width smaller than 16 for deblocking of a vertical boundary or height smaller than 16 for deblocking of a horizontal boundary.

In some embodiments, the boundary of the coding unit is aligned with a coding unit boundary, a transform sub-block boundary, or a prediction sub-block boundary.

In some embodiments, determining the maximum filter length based on the dimension of the transform sub-block within the coding unit comprises: comparing the dimension of the transform sub-block with a predetermined size threshold.

In some embodiments, the maximum filter length on the side of the boundary which is inside the coding unit that uses sub-block transform is set to 7 when the transform sub-block boundary is parallel with a coding unit boundary and is at least equal to or larger than a predetermined size threshold in samples from the transform sub-block boundary.

In some embodiments, the maximum filter length on the side of the boundary inside the coding unit that uses sub-block transform is set to 7 when the boundary is aligned with a transform sub-block boundary and is at least equal to or larger than a predetermined size threshold in samples from another transform or coding unit boundary on that side.

In some embodiments, the maximum filter length is reduced to 5 when the coding unit uses prediction sub-blocks which boundaries are separated by 8 samples or less.

In some embodiments, the maximum filter length is set to 2 when the boundary is aligned with a prediction sub-block boundary and the prediction sub-block boundary is 8 samples from a coding unit boundary or transform block or sub-block boundary.

In some embodiments, the predetermined size threshold is set to 32.

In some embodiments, the boundary is aligned with a coding unit boundary or a transform sub-block boundary and deblocking is applied on a 4×4 grid and the max filter length for the side of the boundary that is inside the coding unit is determined to be larger than 3 and the other side of the boundary is inside a coding unit or sub-block transform unit of size 4 the maximum filter length on that side is determined to be less than 3.

In some embodiments, the maximum transform size is equal to or larger than 32.

In some embodiments, the dimension of the transform sub-block within the coding unit is a width of the transform sub-block when the boundary is vertical boundary, or the dimension of the transform sub-block within the coding unit is a height of the transform sub-block when the boundary is a horizontal boundary.

In another aspect there is provided a second method for deblocking at least one boundary of a coding unit on a 4×4 grid. In some embodiments the second method includes determining a maximum filter length for each side of the boundary based on a dimension of a transform sub-block or a dimension of a coding unit. The method further includes deblocking the boundary based on the determined maximum filter length for the respective side of the boundary.

In some embodiments, the maximum filter length is determined to be larger than 3 on one side for a vertical boundary when the width of the coding unit on that side is equal to or larger than a first predetermined threshold or for a horizontal boundary when the height of the coding unit on that side is equal to or larger than the first predetermined threshold.

In some embodiments, a sub-block transform is used for the coding unit, and the maximum filter length is determined to be larger than 3 on one side for a vertical boundary when the width of a transform sub-block is equal to or larger than a first predetermined threshold or for a horizontal boundary when the height of the transform sub-block is equal to or larger than the first predetermined threshold.

In some embodiments, the maximum filter length is determined to be less than 3 on one side for a vertical boundary when the width of the coding unit on that side is equal to or smaller than a second predetermined threshold or for a horizontal boundary when the height of the coding unit on that side is equal to or smaller than the second predetermined threshold.

In some embodiments, a sub-block transform is used for the coding unit, and the maximum filter length is determined to be less than 3 on one side for a vertical boundary when the width of a transform sub-block on that side is equal to or smaller than a second predetermined threshold or for a horizontal boundary when the height of the transform sub-block on that side is equal to or smaller than the second predetermined threshold.

In some embodiments, the first predetermined threshold is equal to 32 and the second predetermined threshold is equal to 4.

In some embodiments, the maximum filter length is determined to be equal to 7, 5, or 1 for one side.

In some embodiments, the maximum transform size is equal to or larger than 32.

In another aspect a computer program is provided. The computer program includes instructions which when executed by processing circuitry causes the processing circuitry to perform any of the above described methods. In another aspect there is provided a carrier containing the computer program. The carrier is one of an electronic signal, an optical signal, a radio signal, and a computer readable storage medium.

In another aspect an apparatus for deblocking at least one boundary of a coding unit is provided. The apparatus is configured to determine that the coding unit uses a sub-block transform, wherein the sub-block transform generates a transform sub-block boundary within the coding unit, thereby forming at least a transform sub-block within the coding unit. The apparatus is also configured to, as a result of determining that the coding unit uses the sub-block transform, determine a maximum filter length based on a dimension of the transform sub-block within the coding unit, wherein the maximum filter length indicates a maximum number of samples to modify when deblocking a boundary of the coding unit. The apparatus is also configured to deblock the boundary of the coding unit based on the determined maximum filter length.

In another aspect an apparatus for deblocking at least one boundary of a coding unit on a 4×4 grid is provided. The apparatus is configured to determine a maximum filter length for each side of the boundary based on a dimension of a transform sub-block or a dimension of a coding unit. The apparatus is further configured to deblock the boundary based on the determined maximum filter length for the respective side of the boundary.

In another aspect the apparatus includes a computer readable storage medium and processing circuitry (1002) coupled to the computer readable storage medium, wherein the processing circuitry is configured to cause the apparatus to perform any of the above described methods.

In some embodiments, both ISP and SBT may create sub-block boundaries inside a CU parallel with the CU boundary such that max filter length is determined to be larger on a side of a transform sub-block boundary where the distance between the transform sub-block boundary and a neighboring transform sub-block boundary or CU boundary is equal to or larger than 32 than for other transform sub-block boundaries. In some embodiments, the max filter length is reduced if there exists prediction sub-block boundaries parallel to a transform sub-block boundary with distance between the prediction sub-block boundary and the transform sub-block boundary smaller than 16.

In some embodiments, all boundaries are deblocked on an 8×8 grid on picture basis instead of only deblocking inside CUs if the CU boundary is on an 8×8 grid.

In some embodiments, deblocking on a 4×4 grid on picture basis can better handle blocking artifacts from SBT and ISP.

The embodiments disclosed herein provide a significant advantage of efficiently reducing blocking artifacts at sub-block transform boundaries.

BRIEF DESCRIPTION OF THE DRAWINGS

The accompanying drawings, which are incorporated herein and form part of the specification, illustrate various embodiments.

DETAILED DESCRIPTION

Figure 1:
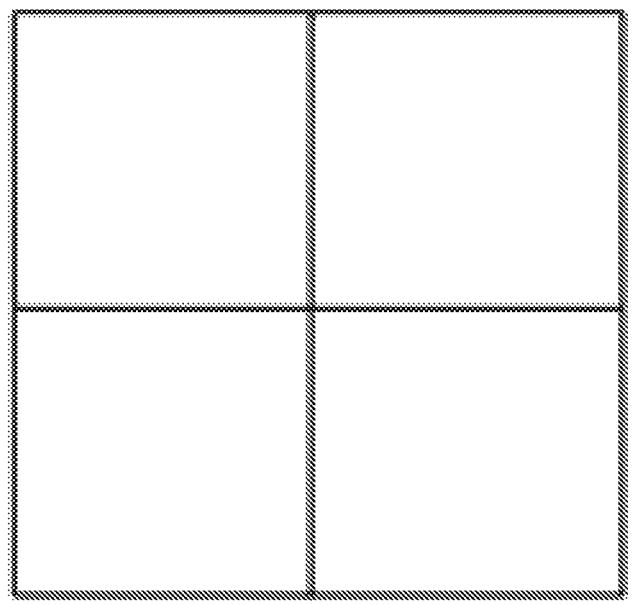
FIG. 1 illustrates a coding unit according to an embodiment.
Figure 2:
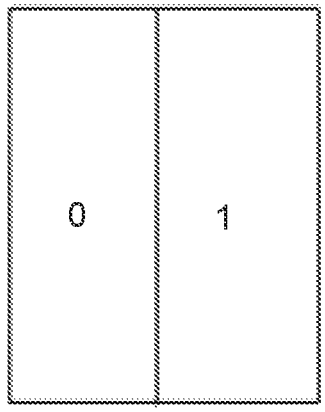
FIG. 2 illustrates coding units using Sub-Block Transform (SBT) according to some embodiments.
Figure 2:
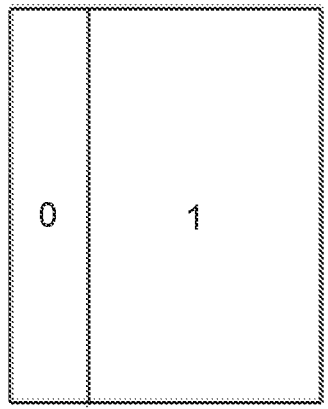
Figure 2:
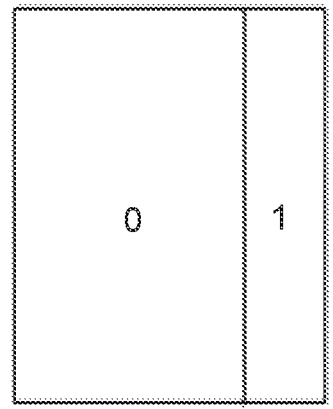
Figure 2:
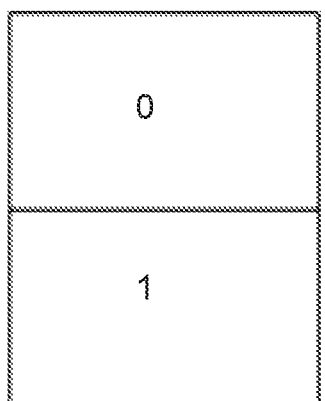
Figure 2:
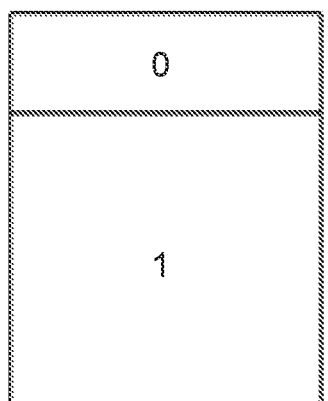
Figure 2:
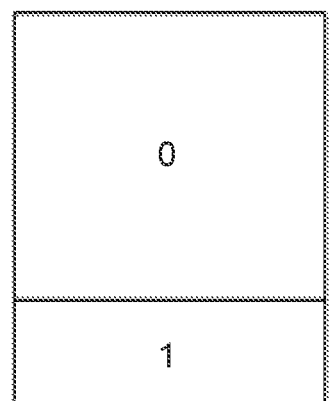
Figure 3:
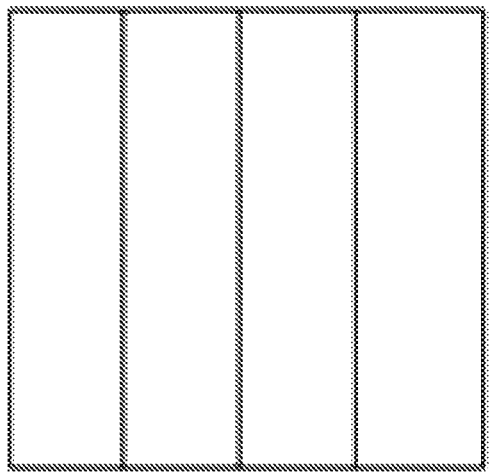
FIG. 3 illustrates coding units using Intra Sub-Partitions (ISP) according to some embodiments.
Figure 3:
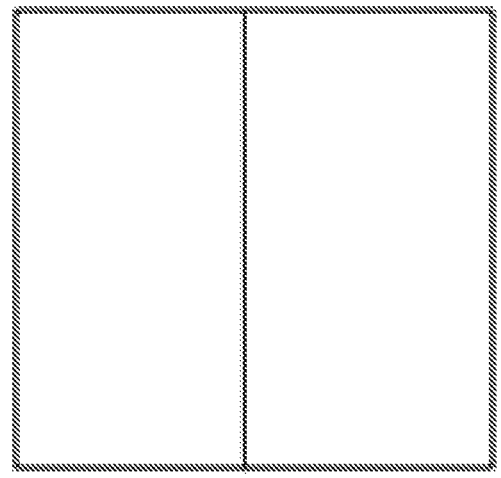
Figure 3:
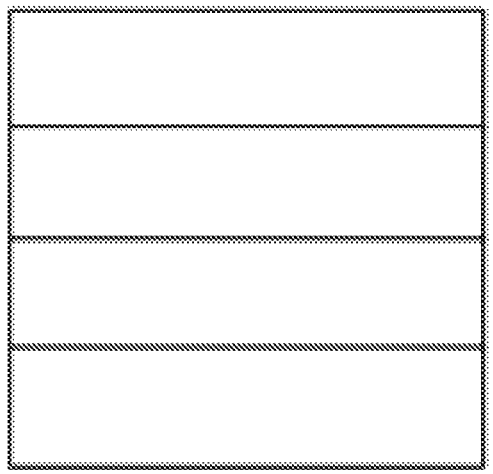
Figure 3:
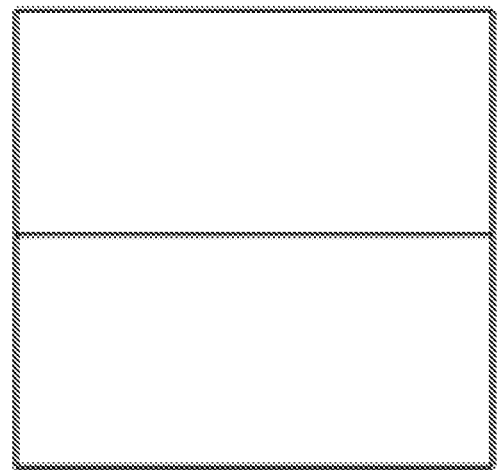
Figure 4:
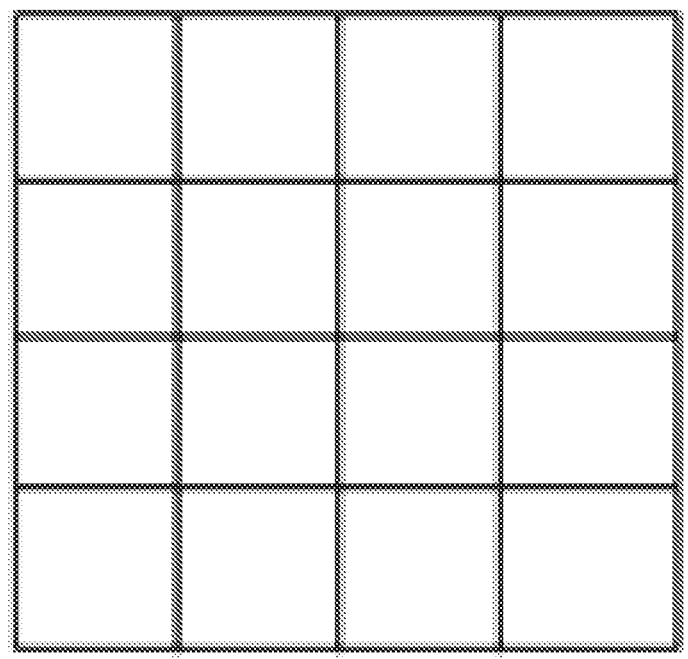
FIG. 4 illustrates a coding unit according to one embodiment.
Figure 5:
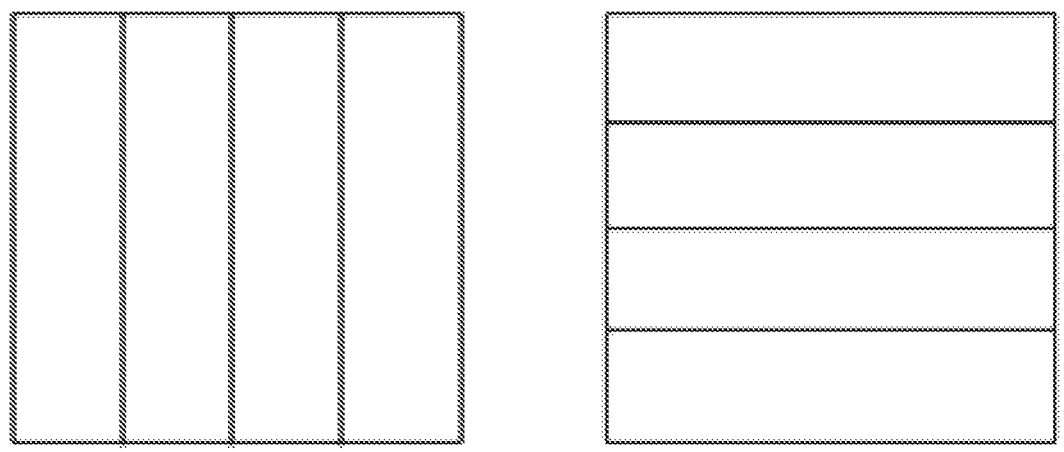
FIG. 5 illustrates coding units according to some embodiments.

The proposed solution may be used in video or image encoder or decoder to deblock transform sub-block boundaries according to some embodiments. For example, transform sub-blocks can come from SBT or ISP, but these are only examples and other tools or modification of those tools may be used in alternative embodiments. In the context of the current disclosure, the term "max filter length" indicates the maximum number of samples to modify. In some embodiments, a maximum number of samples to read is one sample more than a number of samples to modify. In some embodiments, the maximum number of samples to read may be more than one sample more than the number of samples to modify, for example, for deblocking on a 4×4 grid the difference may be three samples.

Disclosed embodiments 1 to 8 described hereinafter are related to SBT and ISP or to tools that use sub-block transforms to handle deblocking with different filter lengths according to some embodiments.

Disclosed embodiment 9 and 10 described hereinafter may be applied on in addition to embodiments 1 to 8 or independently in dealing with interaction between long deblocking and deblocking on a 4×4 grid.

In some embodiments, 32 is used as a size threshold for application of long filters. In alternative embodiments, a threshold of 16 may be used.

Embodiment 1. SBT

Let us now consider deblocking across vertical boundaries and a CU that uses SBT that generates a vertical boundary inside the CU and the CU does not use prediction sub-blocks.

In this embodiment, the max filter length on the side of the CU boundary that is inside the CU is provided as maxFilterLength. maxFilterLength is determined as follows:

$$\text{maxFilterLength} = \text{sub\_block\_pos} \text{ ? } ((\text{CU\_width} - \text{sub\_block\_width}) >= 32 \text{ ? } 7:3) : (\text{sub\_block\_width} >= 32 \text{ ? } 7:3)$$

where sub_block_pos can be 0 or 1 to indicate that the first or the second transform sub-block has non-zero transform coefficients, where sub_block_width indicates the width of the transform sub-block with non-zero coefficients.

In this embodiment, the max filter length on the side of the sub-block boundary that is inside the sub-block with non-zero coefficients is provided as maxFilterLengthQ and the side of the sub-block boundary that is outside the sub-block with non-zero coefficients is provided as maxFilterLengthP. maxFilterLengthQ and maxFilterLengthP are determined as follows:

$$\text{maxFilterLengthQ} = \text{sub\_block\_width} >= 32 \text{ ? } 7:3$$
$$\text{maxFilterLengthP} = (\text{CU\_width} - \text{sub\_block\_width}) >= 32 \text{ ? } 7:3$$

In some embodiments, embodiment 1 described above applies similarly to horizontal boundaries and CUs that uses SBT that generates a horizontal boundary inside the CU by exchanging width with height.

Embodiment 2. SBT and Prediction Sub-Blocks

Let us now consider deblocking across vertical boundaries and a CU that uses SBT that generate a vertical boundary inside the CU and the CU also uses prediction sub-blocks with width smaller than 16.

In this embodiment, the max filter length on the side of the CU boundary that is inside the CU is provided as maxFilterLength. maxFilterLength is determined as follows:

$$\text{maxFilterLength} = \text{sub\_block\_pos} \text{ ? } ((\text{CU\_width} - \text{sub\_block\_width}) >= 32 \text{ ? } 5:3) : (\text{sub\_block\_width} >= 32 \text{ ? } 5:3)$$

where sub_block_pos can be 0 or 1 to indicate that the first or the second transform sub-block has non-zero transform coefficients, where sub_block_width indicate the width of the transform sub-block with non-zero coefficients.

In this embodiment, the max filter length on the side of the sub-block boundary that is inside the sub-block with non-zero coefficients is provided as maxFilterLengthQ and the side of the sub-block boundary that is outside the sub-block with non-zero coefficients is provided as maxFilterLengthP. maxFilterLengthQ and maxFilterLengthP are determined as follows:

```
maxFilterLengthQ = sub_block_width>=32 ? 5:3
maxFilterLengthP = (CU_width − sub_block_width)>=32 ? 5:3
```

In some embodiments, embodiment 2 described above applies similarly to horizontal boundaries and CUs that uses SBT and prediction sub-blocks that generates a horizontal boundary inside the CU by exchanging width with height.

Embodiment 3. ISP

Let us now consider deblocking across vertical boundaries and a CU that uses ISP that generates vertical boundaries inside the CU and the CU do not use prediction sub-blocks.

In this embodiment, the max filter length on the side of the CU boundary that is inside the CU is provided as maxFilterLength and on respective side of a transform sub-block boundary are provided as maxFilterLengthQ and maxFilterLengthP. maxFilterLength, maxFilterLengthQ, and maxFilterLengthP are determined as follows:

```
maxFilterLength=maxFilterLengthQ=maxFilterLengthP=sub-
    block_width>=32?7:3
``` where sub-block_width indicates the width of a transform sub-block.

In some embodiments, embodiment 3 described above applies similarly to horizontal boundaries and CUs that uses ISP that generates a horizontal boundary inside the CU by exchanging width with height.

Embodiment 4. ISP with Prediction Sub-Blocks

Let us now consider deblocking across vertical boundaries and a CU that uses ISP that generates vertical boundaries inside the CU and the CU also uses prediction sub-blocks with width smaller than 16.

In this embodiment, the max filter length on the side of the CU boundary that is inside the CU is provided as maxFilterLength and on respective side of a transform sub-block boundary are provided as maxFilterLengthQ and maxFilterLengthP. maxFilterLength, maxFilterLengthQ, and maxFilterLengthP are determined as follows:

```
maxFilterLength=maxFilterLengthQ=maxFilterLengthP=sub-
    block_width>=32?5:3
``` where sub-block_width indicates the width of a transform sub-block.

In some embodiment, embodiment 4 described above applies similarly to horizontal boundaries and CUs that uses ISP that generates a horizontal boundary inside the CU and prediction sub-blocks by exchanging width with height.

Embodiment 5

As provided above in any one of embodiments 1 to 4 with the additional constraint that deblocking is not applied for transform sub-block boundaries that are separated by less than 4 samples on both sides to respective neighbor transform sub-block boundary.

In alternative embodiments, deblocking is not applied if at least one side is separated by less than 4 samples to next transform sub-block boundary.

Embodiment 6

As provided above in any one of embodiments 1 to 4 with the additional condition that the allowed maximum transform size is equal to or larger than 32.

Embodiment 7

As provided above in any one of embodiments 1 to 4, wherein the grid for deblocking is 8×8 on a picture basis.

In some embodiments, this can handle deblocking of some of the transform sub-block boundaries that lies on a 4×4 grid from the CU boundary.

Embodiment 8

As provided above in any one of embodiments 1 to 4, wherein the grid for deblocking is 4×4 on a picture basis.

Embodiment 9

Let us now consider deblocking across vertical boundaries and that deblocking is applied on a 4×4 grid.

In some embodiments, if the width of one side of the boundary is equal or larger than 32 and where the width of the other side is less than 32 an additional check for the width on the side with width less than 32 to set the max filter length to 1 (modifying at most one sample) if the width is equal to 4 and set the max filter length to 3 if the width is larger than 4 (this corresponds to equal to 8 or larger since only multiple of 2 is used). In some embodiments, if the width is smaller than 4 no filtering is applied on either side of the boundary.

The width on one side of the boundary may refer to at least one of: width of a transform sub-block; and distance between the boundary and the closest block boundary where the boundaries are parallel to each other.

In some embodiments, embodiment 9 described above applies similarly to horizontal boundaries by exchanging width with height.

Embodiment 10

As provided above in embodiment 9 with the additional condition that deblocking is not applied on the side with width smaller than 4.

In some embodiments, embodiment 10 described above applies similarly to horizontal boundaries by exchanging width with height.

Embodiment 11

Any combination of the embodiments provided above, e.g., embodiments 1-10.

Figure 6:
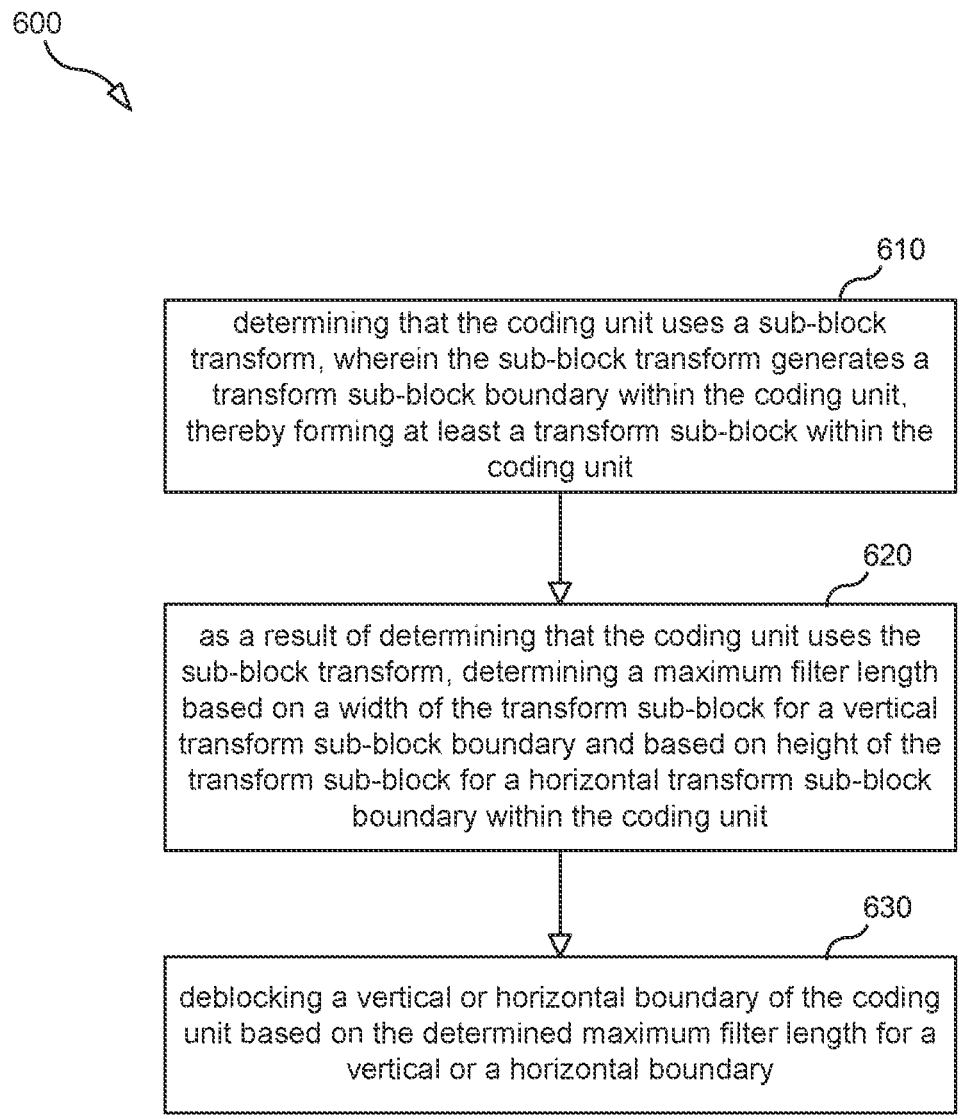
FIG. 6 is a flow chart illustrating a process according to an embodiment.

FIG. 6 is flow chart illustrating a process 600 according to an embodiment. Process 600 is a method for deblocking at least one vertical or horizontal boundary of a coding unit for encoding and/or decoding a video picture. The 600 method includes determining that the coding unit uses a sub-block transform, wherein the sub-block transform generates a transform sub-block boundary within the coding unit, thereby forming at least a transform sub-block within the coding unit (610); determining a maximum filter length based on a width of the transform sub-block for a vertical transform sub-block boundary and based on height of the transform sub-block for a horizontal transform sub-block boundary within the coding unit as a result of determining that the coding unit uses the sub-block transform (620), wherein the maximum filter length indicates a maximum number of samples to modify when deblocking a vertical or horizontal boundary of the coding unit; and deblocking a vertical or horizontal boundary of the coding unit based on the determined maximum filter length for a vertical or a horizontal boundary (630).

In some embodiments, the sub-block transform comprises Sub-Block Transforms (SBT) and/or Intra Sub Partitions (ISP).

In some embodiments, the determined max filter length is reduced if the coding unit uses prediction sub-blocks comprising a width smaller than 16 for deblocking of a vertical boundary or height smaller than 16 for deblocking of a horizontal boundary.

In some embodiments, the boundary comprises a boundary aligned with the coding unit boundary, a boundary aligned with a transform sub-block boundary or a boundary aligned with a prediction sub-block boundary.

In some embodiments, determining the maximum filter length based on the width or height of the transform sub-block within the coding unit comprises comparing the width or height of the transform sub-block with a predetermined size threshold.

In some embodiments, the maximum filter length on the side of the boundary which is inside the coding unit is set to 7 when the boundary is aligned with the coding unit boundary and the transform sub-block boundary is parallel with the coding unit boundary and is at least equal to or larger than a predetermined size threshold in samples from the transform sub-block boundary.

In some embodiments, the maximum filter length on that side of the boundary is set to 7 when the boundary is aligned with a transform sub-block boundary and is at least equal to or larger than a predetermined size threshold in samples from another the transform or coding unit boundary.

In some embodiments, the maximum filter length is reduced to 5 when the coding unit uses prediction sub-blocks which boundaries are separated by 8 samples or less.

In some embodiments, the maximum filter length is set to 2 for that side of the prediction sub-block boundary when the boundary is aligned with a prediction sub-block boundary and the prediction sub-block boundary is 8 samples from a coding unit boundary or transform block or sub-block boundary.

In some embodiments, the predetermined threshold is set to 32.

In some embodiments, the boundary is aligned with the coding unit boundary or a transform sub-block boundary and deblocking is applied on a 4×4 grid and the max filter length for the side of the boundary that is inside the coding unit is determined to be larger than 3 and the other side of the boundary is inside a coding unit or sub-block transform unit of size 4 the maximum filter length on that side is determined to be less than 3.

In some embodiments, the maximum transform size is equal to or larger than 32.

Figure 7:
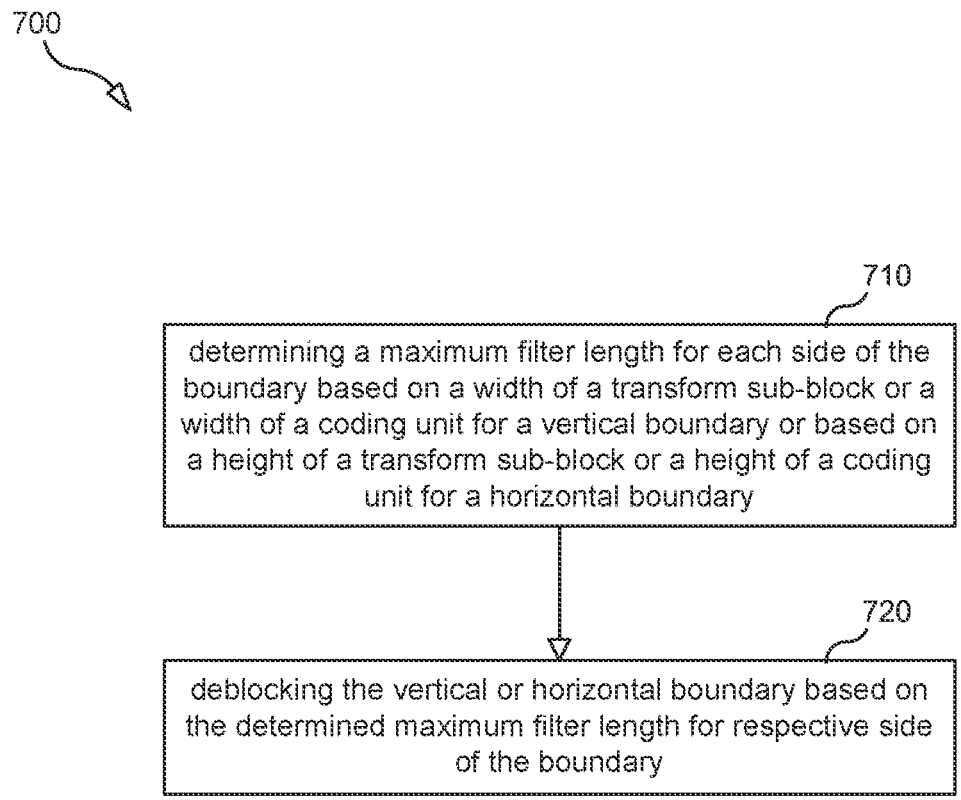
FIG. 7 is a flow chart illustrating a process according to an embodiment.

FIG. 7 is flow chart illustrating a process 700 according to an embodiment. Process 700 is a method for deblocking at least one vertical or horizontal boundary of a coding unit on a 4×4 grid for encoding and/or decoding a video picture. The 700 method includes determining a maximum filter length for each side of the boundary based on a width of a transform sub-block or a width of a coding unit for a vertical boundary or based on a height of a transform sub-block or a height of a coding unit for a horizontal boundary (710); and deblocking the vertical or horizontal boundary based on the determined maximum filter length for respective side of the boundary (720).

In some embodiments, the maximum filter length is determined to be larger than 3 on one side for a vertical boundary when the width of the coding unit on that side is equal to or larger than a first predetermined threshold or for a horizontal boundary when the height of the coding unit on that side is equal to or larger than the first predetermined threshold.

In some embodiments, a sub-block transform is used for the coding unit and the maximum filter length is determined to be larger than 3 on one side for a vertical boundary when the width of a transform sub-block is equal to or larger than a first predetermined threshold or for a horizontal boundary when the height of the transform sub-block is equal to or larger than the first predetermined threshold.

In some embodiments, the maximum filter length is determined to be less than 3 on one side for a vertical boundary when the width of the coding unit on that side is equal to or smaller than a second predetermined threshold or for a horizontal boundary when the height of the coding unit on that side is equal to or smaller than the second predetermined threshold.

In some embodiments, a sub-block transform is used for the coding unit and the maximum filter length is determined to be less than 3 on one side for a vertical boundary when the width of a transform sub-block on that side is equal to or smaller than a second predetermined threshold or for a horizontal boundary when the height of the transform sub-block on that side is equal to or smaller than the second predetermined threshold.

In some embodiments, the first predetermined threshold is equal to 32 and the second predetermined threshold is equal to 4.

In some embodiments, the maximum filter length is determined to be equal to 7 for one side.

In some embodiments, the maximum filter length is determined to be equal to 5 for one side.

In some embodiments, the maximum filter length is determined to be equal to 1 for one side.

In some embodiments, the maximum transform size is equal to or larger than 32.

Figure 8:
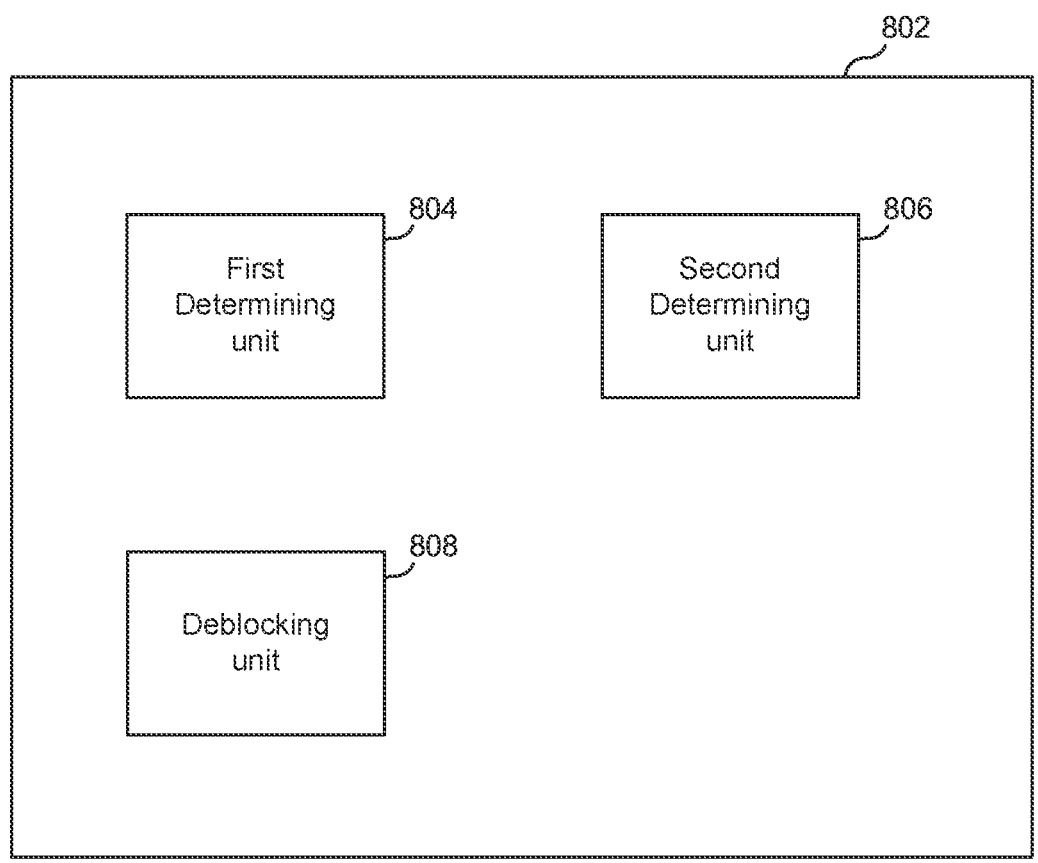
FIG. 8 is a diagram showing functional units of an encoder or decoder according to one embodiment.

FIG. 8 is a diagram showing functional units of an encoder or a decoder 802 according to some embodiments. As shown in FIG. 8, the encoder or decoder 802 includes a first determining unit (804) for determining that the coding unit uses a sub-block transform, wherein the sub-block transform generates a transform sub-block boundary within the coding unit, thereby forming at least a transform sub-block within the coding unit; and a second determining unit (806) for determining a maximum filter length based on a width of the transform sub-block for a vertical transform sub-block boundary and based on height of the transform sub-block for a horizontal transform sub-block boundary within the coding unit as a result of determining that the coding unit uses the sub-block transform, wherein the maximum filter length indicates a maximum number of samples to modify when deblocking a vertical or horizontal boundary of the coding unit; and a deblocking unit (808) for deblocking a vertical or horizontal boundary of the coding unit based on the determined maximum filter length for a vertical or a horizontal boundary.

Figure 9:
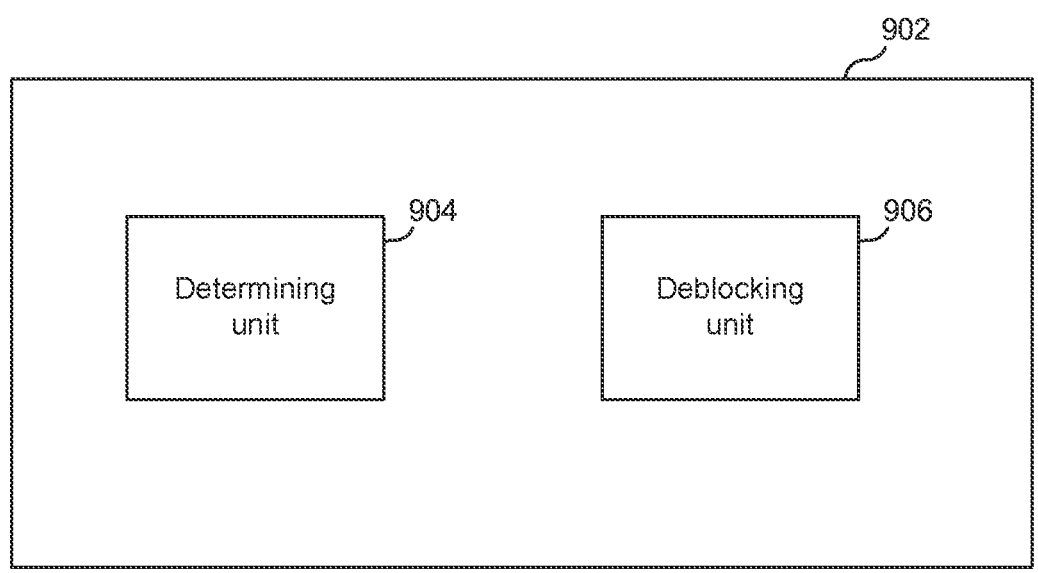
FIG. 9 is a diagram showing functional units of an encoder or decoder according to one embodiment.

FIG. 9 is a diagram showing functional units of an encoder or a decoder 902 according to some embodiments. As shown in FIG. 9, the encoder or decoder 902 includes a determining unit (904) for determining a maximum filter length for each side of the boundary based on a width of a transform sub-block or a width of a coding unit for a vertical boundary or based on a height of a transform sub-block or a height of a coding unit for a horizontal boundary; and a deblocking unit (906) for deblocking the vertical or horizontal boundary based on the determined maximum filter length for respective side of the boundary.

Figure 10:
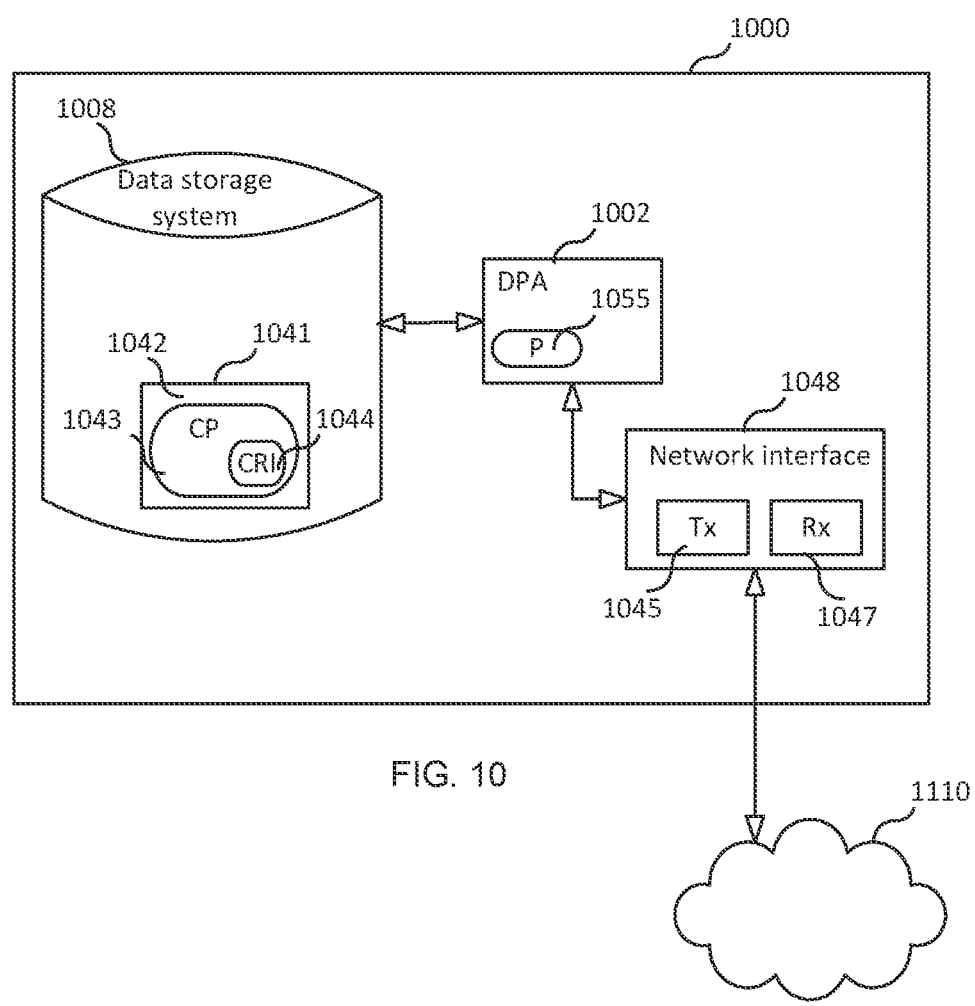
FIG. 10 is a block diagram of an apparatus according to some embodiments.

FIG. 10 is a block diagram of an apparatus 1000 for implementing encoder or decoder 802, 902, according to some embodiments. As shown in FIG. 10, the apparatus may comprise: processing circuitry (PC) 1002, which may include one or more processors (P) 1055 (e.g., a general purpose microprocessor and/or one or more other processors, such as an application specific integrated circuit (ASIC), field-programmable gate arrays (FPGAs), and the like); a network interface 1048 comprising a transmitter (Tx) 1045 and a receiver (Rx) 1047 for enabling the apparatus to transmit data to and receive data from other nodes connected to a network 1110 (e.g., an Internet Protocol (IP) network) to which network interface 1048 is connected; and a local storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes the apparatus to perform steps described herein (e.g., steps described herein with reference to the flow charts). In other embodiments, the apparatus may be configured to perform steps described herein without the need for code. That is, for example, PC 1002 may consist merely of one or more ASICs. Hence, the features of the embodiments described herein may be implemented in hardware and/or software.

SUMMARY OF VARIOUS EMBODIMENTS

A1. A method for deblocking at least one vertical or horizontal boundary of a coding unit for encoding and/or decoding a video picture, the method comprising: determining that the coding unit uses a sub-block transform, wherein the sub-block transform generates a transform sub-block boundary within the coding unit, thereby forming at least a transform sub-block within the coding unit; as a result of determining that the coding unit uses the sub-block transform, determining a maximum filter length based on a width of the transform sub-block for a vertical transform sub-block boundary and based on height of the transform sub-block for a horizontal transform sub-block boundary within the coding unit, wherein the maximum filter length indicates a maximum number of samples to modify when deblocking a vertical or horizontal boundary of the coding unit; and deblocking a vertical or horizontal boundary of the coding unit based on the determined maximum filter length for a vertical or a horizontal boundary.

A2. The method of embodiment A1, wherein the sub-block transform comprises Sub-Block Transforms (SBT) and/or Intra Sub Partitions (ISP).

A3. The method of embodiment A1 or A2, wherein the determined max filter length is reduced if the coding unit uses prediction sub-blocks comprising a width smaller than 16 for deblocking of a vertical boundary or height smaller than 16 for deblocking of a horizontal boundary.

A4. The method of any one of embodiments A1 to A3, wherein the boundary comprises a boundary aligned with the coding unit boundary, a boundary aligned with a transform sub-block boundary or a boundary aligned with a prediction sub-block boundary.

A5. The method of any one of embodiments A1 to A4, wherein determining the maximum filter length based on the width or height of the transform sub-block within the coding unit comprises: comparing the width or height of the transform sub-block with a predetermined size threshold.

A6. The method of any one of embodiments A1 to A5, wherein the maximum filter length on the side of the boundary which is inside the coding unit is set to 7 when the boundary is aligned with the coding unit boundary and the transform sub-block boundary is parallel with the coding unit boundary and is at least equal to or larger than a predetermined size threshold in samples from the transform sub-block boundary.

A7. The method of any one of embodiments A1 to A5, wherein the maximum filter length on that side of the boundary is set to 7 when the boundary is aligned with a transform sub-block boundary and is at least equal to or larger than a predetermined size threshold in samples from another the transform or coding unit boundary.

A8. The method of embodiment A6 or A7, wherein the maximum filter length is reduced to 5 when the coding unit uses prediction sub-blocks which boundaries are separated by 8 samples or less.

A9. The method of any one of embodiments A1 to A5, wherein the maximum filter length is set to 2 for that side of the prediction sub-block boundary when the boundary is aligned with a prediction sub-block boundary and the prediction sub-block boundary is 8 samples from a coding unit boundary or transform block or sub-block boundary.

A10. The method of any one of embodiments A5 to A7, wherein the predetermined threshold is set to 32.

A11. The method of any one of embodiments A1 to A10, wherein the boundary is aligned with the coding unit boundary or a transform sub-block boundary and deblocking is applied on a 4×4 grid and the max filter length for the side of the boundary that is inside the coding unit is determined to be larger than 3 and the other side of the boundary is inside a coding unit or sub-block transform unit of size 4 the maximum filter length on that side is determined to be less than 3.

A12. The method of any one of embodiments A1 to A11, wherein the maximum transform size is equal to or larger than 32.

B1. A method for deblocking at least one vertical or horizontal boundary of a coding unit on a 4×4 grid for encoding and/or decoding a video picture, the method comprising: determining a maximum filter length for each side of the boundary based on a width of a transform sub-block or a width of a coding unit for a vertical boundary or based on a height of a transform sub-block or a height of a coding unit for a horizontal boundary; and deblocking the vertical or horizontal boundary based on the determined maximum filter length for respective side of the boundary.

B2. The method of embodiment B1, wherein the maximum filter length is determined to be larger than 3 on one side for a vertical boundary when the width of the coding unit on that side is equal to or larger than a first predetermined threshold or for a horizontal boundary when the height of the coding unit on that side is equal to or larger than the first predetermined threshold.

B3. The method of embodiment B1, wherein a sub-block transform is used for the coding unit, and wherein the maximum filter length is determined to be larger than 3 on one side for a vertical boundary when the width of a transform sub-block is equal to or larger than a first predetermined threshold or for a horizontal boundary when the height of the transform sub-block is equal to or larger than the first predetermined threshold.

B4. The method of any one of embodiments B1 to B3, wherein the maximum filter length is determined to be less than 3 on one side for a vertical boundary when the width of the coding unit on that side is equal to or smaller than a second predetermined threshold or for a horizontal boundary when the height of the coding unit on that side is equal to or smaller than the second predetermined threshold.

B5. The method of any one of embodiments B1 to B3, wherein a sub-block transform is used for the coding unit, and wherein the maximum filter length is determined to be less than 3 on one side for a vertical boundary when the width of a transform sub-block on that side is equal to or smaller than a second predetermined threshold or for a horizontal boundary when the height of the transform sub-block on that side is equal to or smaller than the second predetermined threshold.

B6. The method of any one of embodiments B2 to B5, wherein the first predetermined threshold is equal to 32 and the second predetermined threshold is equal to 4.

B7. The method of embodiment B2 or B3, wherein the maximum filter length is determined to be equal to 7 for one side.

B8. The method of embodiment B2 or B3, wherein the maximum filter length is determined to be equal to 5 for one side.

B9. The method of embodiment B4 or B5, wherein the maximum filter length is determined to be equal to 1 for one side.

B10. The method of any one of embodiments B1 to B9, wherein the maximum transform size is equal to or larger than 32.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for deblocking at least one boundary of a coding unit, the method comprising:
   determining that the coding unit uses a sub-block transform, wherein the sub-block transform generates a transform sub-block boundary within the coding unit, thereby forming at least a transform sub-block within the coding unit, and wherein the sub-block transform comprises Sub-Block Transforms;
   as a result of determining that the coding unit uses the sub-block transform, determining a maximum filter length based on a dimension of the transform sub-block within the coding unit, wherein the dimension of the transform sub-block within the coding unit is a width of the transform sub-block when the boundary is vertical boundary or a height of the transform sub-block when the boundary is a horizontal boundary, wherein the determining comprises comparing the dimension of the transform sub-block with a predetermined size threshold, wherein the maximum filter length indicates a maximum number of samples to modify when deblocking a boundary of the coding unit, and wherein the determined maximum filter length is reduced if the coding unit uses prediction sub-blocks comprising a width smaller than 16 for deblocking of a vertical boundary or height smaller than 16 for deblocking of a horizontal boundary; and
   deblocking the boundary of the coding unit based on the determined maximum filter length, wherein
   the boundary of the coding unit is aligned with a transform sub-block boundary, and
   the maximum filter length on the side of the boundary inside the coding unit that uses sub-block transform is set to 7 when the boundary is aligned with a transform sub-block boundary and is at least equal to or larger than a predetermined size threshold in samples from another transform or coding unit boundary on that side.

2. The method of claim 1, wherein the maximum filter length is reduced to 5 when the coding unit uses prediction sub-blocks which boundaries are separated by 8 samples or less.

3. The method of claim 1, wherein the predetermined size threshold is set to 32.

4. The method of claim 1, wherein the boundary is aligned with a coding unit boundary or a transform sub-block boundary and deblocking is applied on a 4×4 grid and the max filter length for the side of the boundary that is inside the coding unit is determined to be larger than 3 and the other side of the boundary is inside a coding unit or sub-block transform unit of size 4 the maximum filter length on that side is determined to be less than 3.

5. The method of claim 1, wherein the maximum transform size is equal to or larger than 32.

6. A computer program product comprising a non-transitory computer readable medium storing a computer program comprising instructions which when executed by processing circuitry of an apparatus causes the apparatus to perform the method of claim 1.

7. An apparatus for deblocking at least one boundary of a coding unit, the apparatus comprising:
   memory; and
   processing circuitry coupled to the memory, wherein the apparatus is configured to:
   determine that the coding unit uses a sub-block transform, wherein the sub-block transform generates a transform sub-block boundary within the coding unit, thereby forming at least a transform sub-block within the coding unit, and wherein the sub-block transform comprises Sub-Block Transforms;
   as a result of determining that the coding unit uses the sub-block transform, determine a maximum filter length based on a dimension of the transform sub-block within the coding unit, wherein the dimension of the transform sub-block within the coding unit is a width of the transform sub-block when the boundary is vertical boundary or a height of the transform sub-block when the boundary is a horizontal boundary, wherein the determining comprises comparing the dimension of the transform sub-block with a predetermined size threshold, wherein the maximum filter length indicates a maximum number of samples to modify when deblocking a boundary of the coding unit, wherein the determined max filter length is reduced if the coding unit uses prediction sub-blocks comprising a width smaller than 16 for deblocking of a vertical boundary or height smaller than 16 for deblocking of a horizontal boundary; and deblock the boundary of the coding unit based on the determined maximum filter length, wherein the boundary of the coding unit is aligned with a transform sub-block boundary, and the maximum filter length on the side of the boundary inside the coding unit that uses sub-block transform is set to 7 when the boundary is aligned with a transform sub-block boundary and is at least equal to or larger than a predetermined size threshold in samples from another transform or coding unit boundary on that side.

8. The apparatus of claim 7, wherein the maximum filter length is reduced to 5 when the coding unit uses prediction sub-blocks which boundaries are separated by 8 samples or less.

9. The apparatus of claim 7, wherein the predetermined size threshold is set to 32.

10. The apparatus of claim 7, wherein the boundary is aligned with a coding unit boundary or a transform sub-block boundary and deblocking is applied on a 4×4 grid and the max filter length for the side of the boundary that is inside the coding unit is determined to be larger than 3 and the other side of the boundary is inside a coding unit or sub-block transform unit of size 4 the maximum filter length on that side is determined to be less than 3.

11. The apparatus of claim 7, wherein the maximum transform size is equal to or larger than 32.

\* \* \* \* \*

UNITED STATES PATENT AND TRADEMARK OFFICE
CERTIFICATE OF CORRECTION

PATENT NO. : 12,167,043 B2
APPLICATION NO. : 18/370081
DATED : December 10, 2024
INVENTOR(S) : Andersson et al.

Page 1 of 1

It is certified that error appears in the above-identified patent and that said Letters Patent is hereby corrected as shown below:

In the Specification

In Column 1, Line 11, delete "filed Feb." and insert -- filed on Feb. --, therefor.

In Column 2, Lines 38-39, delete "if one any" and insert -- if any one --, therefor.

In Column 3, Line 38, delete "sub-blocks;" and insert -- sub-blocks. --, therefor.

In Column 4, Line 28, delete "Similarily" and insert -- Similarly --, therefor.

In Column 9, Lines 21-22, delete "maxFilterLength=maxFilterLengthQ=maxFilterLengthP=sub-block_width>-32?7:3" and insert -- maxFilterLength=maxFilterLengthQ=maxFilterLengthP=sub_block_width>-32?7:3 --, therefor.

In Column 9, Line 23, delete "sub-block_width" and insert -- sub_block_width --, therefor.

In Column 9, Lines 43-44, delete "maxFilterLength=maxFilterLengthQ=maxFilterLengthP=sub-block_width>-32?5:3" and insert -- maxFilterLength=maxFilterLengthQ=maxFilterLengthP=sub_block_width>-32?5:3 --, therefor.

In Column 9, Line 45, delete "sub-block_width" and insert -- sub_block_width --, therefor.

Signed and Sealed this
Twenty-ninth Day of April, 2025

Coke Morgan Stewart
*Acting Director of the United States Patent and Trademark Office*